United States Patent
Watari et al.

(10) Patent No.: US 12,151,696 B2
(45) Date of Patent: Nov. 26, 2024

(54) VEHICLE SYSTEM

(71) Applicant: TOYOTA JIDOSHA KABUSHIKI KAISHA, Toyota (JP)

(72) Inventors: Yuji Watari, Toyota (JP); Masaya Sato, Okazaki (JP); Ryo Irie, Okazaki (JP); Takeshi Kanou, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 231 days.

(21) Appl. No.: 17/725,295

(22) Filed: Apr. 20, 2022

(65) Prior Publication Data
US 2022/0340157 A1 Oct. 27, 2022

(30) Foreign Application Priority Data
Apr. 22, 2021 (JP) .................. 2021-072661

(51) Int. Cl.
*B60W 50/12* (2012.01)
*B60W 60/00* (2020.01)
*G07C 5/08* (2006.01)

(52) U.S. Cl.
CPC .......... *B60W 50/12* (2013.01); *B60W 60/001* (2020.02); *G07C 5/0816* (2013.01); *B60W 2510/18* (2013.01); *B60W 2510/20* (2013.01)

(58) Field of Classification Search
CPC ................. B60W 10/20; B60W 50/12; B60W 60/001–00276; B60W 2510/20–205; B60W 2510/087; B62D 15/0285; B62D 5/0481–0496

USPC .......................................................... 701/22
See application file for complete search history.

(56) References Cited

U.S. PATENT DOCUMENTS

| | | | | |
|---|---|---|---|---|
| 2003/0193305 A1* | 10/2003 | Crowley | .............. | B62D 5/0481 |
| | | | | 318/432 |
| 2006/0090954 A1* | 5/2006 | Sugitani | ................. | B62D 5/003 |
| | | | | 180/446 |
| 2008/0024080 A1* | 1/2008 | Ogawa | ................. | B62D 5/0496 |
| | | | | 318/432 |
| 2011/0178681 A1* | 7/2011 | Gu | ........................ | B62D 5/0496 |
| | | | | 701/42 |
| 2013/0043989 A1* | 2/2013 | Niemz | ............... | B62D 15/0285 |
| | | | | 701/25 |
| 2014/0129091 A1* | 5/2014 | Yamazaki | ............ | B62D 5/0496 |
| | | | | 701/42 |

(Continued)

FOREIGN PATENT DOCUMENTS

| | | |
|---|---|---|
| EP | 3 503 377 A1 | 6/2019 |
| JP | 2005269878 A * | 9/2005 |

(Continued)

*Primary Examiner* — Hung Q Nguyen
*Assistant Examiner* — Mark L. Greene
(74) *Attorney, Agent, or Firm* — Sughrue Mion, PLLC (57) ABSTRACT

A vehicle system, including: an on-board device mounted on a vehicle; and a control device configured to control the on-board device such that the vehicle travels in a target traveling state, wherein the control device includes: a predicting portion that predicts a state of the on-board device when the vehicle travels in the target traveling state; and a modifying portion that modifies the target traveling state when the control device determines based on the state of the on-board device predicted by the predicting portion that an operation of the on-board device needs to be limited.

2 Claims, 4 Drawing Sheets

(56) References Cited

U.S. PATENT DOCUMENTS

| | | | | |
|---|---|---|---|---|
| 2016/0185389 A1* | 6/2016 | Ishijima | ............ | B62D 15/0285 |
| | | | | 701/41 |
| 2016/0375933 A1* | 12/2016 | Hiei | .................... | B62D 5/0469 |
| | | | | 701/41 |
| 2020/0239066 A1* | 7/2020 | Kato | .................... | B62D 5/0466 |
| 2022/0048538 A1* | 2/2022 | Zaydel | ............. | B60W 60/0025 |
| 2022/0410873 A1* | 12/2022 | Katsu | .................. | B62D 5/0496 |

FOREIGN PATENT DOCUMENTS

| | | |
|---|---|---|
| JP | 2010-247571 A | 11/2010 |
| JP | 2014-168340 A | 9/2014 |
| JP | 2007-183205 A | 7/2019 |
| JP | 2019-110735 A | 7/2019 |
| JP | 2020-163984 A | 10/2020 |
| JP | 2021-110575 A | 8/2021 |
| WO | 2019/189648 A1 | 10/2019 |

* cited by examiner

VEHICLE SYSTEM

CROSS REFERENCE TO RELATED APPLICATION

The present application claims priority to Japanese Patent Application No. 2021-072661, which was filed on Apr. 22, 2021, the disclosure of which is herein incorporated by reference in its entirety.

BACKGROUND

Technical Field

The following disclosure relates to a vehicle system.

Description of Related Art

Patent Document 1 (Japanese Patent Application Publication No. 2020-163984) discloses a vehicle system that performs automated driving. In the disclosed vehicle system, a stop position of a vehicle is determined based on a road condition recognized by an outside recognition device such as a camera. Based on the condition of a road shoulder at the determined stop position, the vehicle system modifies a travel plan (a travel route, deceleration, and the stop position) according to which the vehicle travels to the stop position.

SUMMARY

An aspect of the present disclosure is directed to a technique of making vehicle control less likely to be suspended due to limitation on an operation of an on-board device mounted on a vehicle.

It is common for a vehicle system to be designed such that protection control is executed for liming the operation of the on-board device in an attempt to prevent overheating of the on-board device. When the protection control for the on-board device starts to be executed, however, the vehicle control is suspended in some cases. In the vehicle system according to the present disclosure, a target traveling state in the vehicle control is changed in accordance with limitation on the operation of the on-board device. In a situation in which the on-board device is operated so as to attain the target traveling state, for instance, the target traveling state can be changed when the on-board device is predicted to reach a state in which the protection control therefor is started. It is consequently possible to make the protection control less likely to be started, thereby making the vehicle control less likely to be suspended.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Referring to the drawings, there will be described a vehicle system according to one embodiment of the present disclosure.

Figure 1:
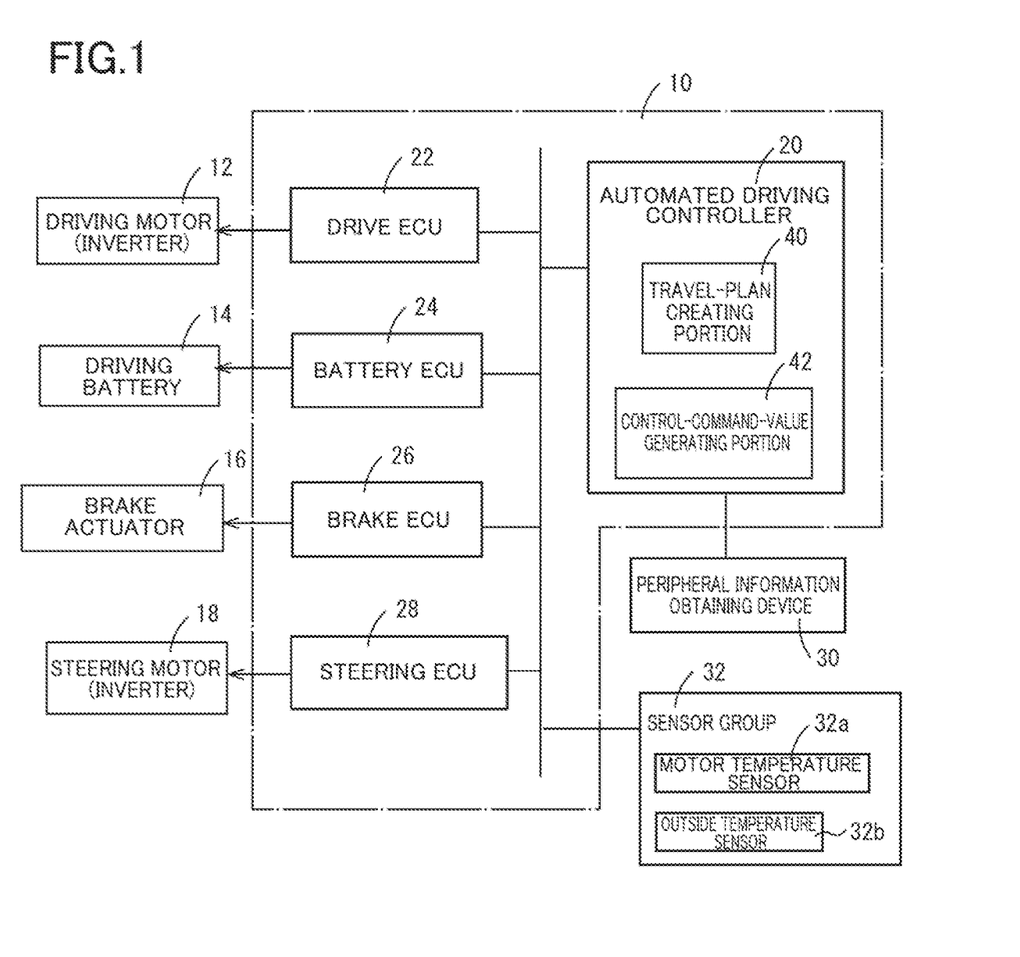
FIG. 1 is a view conceptually illustrating a vehicle system according to one embodiment of the present disclosure.

As illustrated in FIG. 1, the vehicle system includes a control device 10 and a plurality of on-board devices, i.e., a driving motor 12, a driving battery 14, a brake actuator 16, and a steering motor 18. The steering motor 18 is one example of a steering actuator.

The control device 10 includes an automated driving controller 20, a drive electronic control unit (ECU) 22, a battery ECU 24, a brake ECU 26, and a steering ECU 28, for instance. Each of the automated driving controller 20, the drive ECU 22, the battery ECU 24, the brake ECU 26, and the steering ECU 28 is constituted principally by a computer. These devices are communicable to one another so as to perform transmission and reception of information thereamong. There are connected, to the control device 10, a peripheral information obtaining device 30 and a sensor group 32.

The peripheral information obtaining device 30 includes, a camera, a radar, and so on. Based on information obtained by the camera, the radar, and so on, the peripheral information obtaining device 30 recognizes an object or the like present in surroundings of the vehicle (own vehicle) and obtains a relative positional relationship between the own vehicle and the object, a road condition, etc. The road condition includes a curved state of the road and a gradient of the road, for instance.

The sensor group 32 includes a plurality of sensors. For instance, the plurality of sensors includes a vehicle speed sensor for detecting a traveling speed of the vehicle, a voltage sensor for detecting a voltage of the driving battery 14, a rotational speed sensor for detecting a rotational speed of the steering motor 18, a steering angle sensor for detecting a steering angle of steerable wheels of the vehicle, a motor temperature sensor 32a for detecting a temperature of the steering motor 18, and an outside temperature sensor 32b for detecting an outside temperature.

The automated driving controller 20 includes a travel-plan creating portion 40 and a control-command-value generating portion 42.

The travel-plan creating portion 40 creates a travel plan based on navigation information, etc., including map information and modifies the created travel plan. The travel plan is conceptually illustrated in FIG. 6. The travel plan includes a travel route candidate (also referred to as a planned travel route) and target traveling values, for instance. The travel route candidate, which is a candidate for the travel route to a destination, is searched according to a known route searching method and is created based on the search result. The target traveling values include, for instance, a target traveling speed, target lateral acceleration, target lateral jerk, and target longitudinal acceleration set for in each of a plurality of sections included in the travel route candidate. In creating the travel plan, the road condition and the relative positional relationship between the own vehicle and the object obtained by the peripheral information obtaining device 30 are also taken into consideration.

Figure 6:
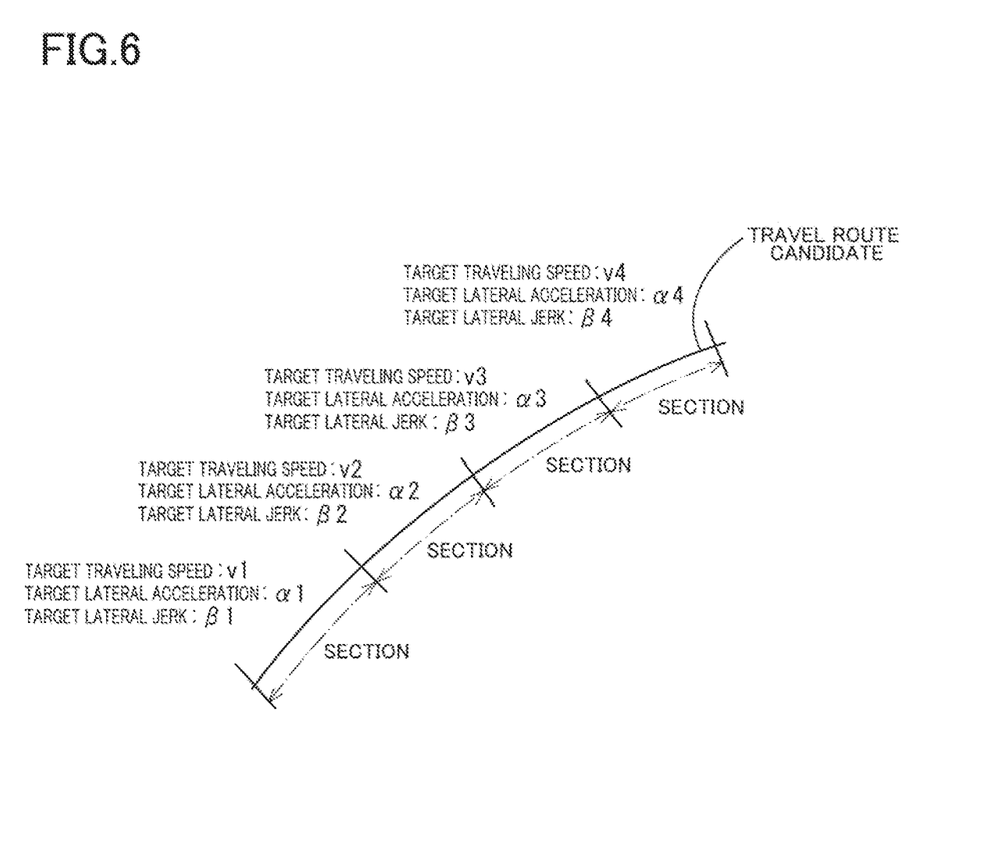
FIG. 6 is a view conceptually illustrating a travel plan.

Modification of the travel plan includes changing the travel route candidate and changing at least one of the target traveling values, for instance.

The control-command-value generating portion 42 generates control command values for the driving motor 12, the brake actuator 16, the steering motor 18, etc., for enabling the vehicle to travel according to the travel plan created by the travel-plan creating portion 40. The control command values generated by the control-command-value generating portion 42 are supplied to the drive ECU 22, the brake ECU 26, the steering ECU 28, etc. Further, the control-command-value generating portion 42 generates a control command value for a cooling fan of the driving battery 14 and supplies the control command value to the battery ECU 24.

The drive ECU 22 controls the driving motor 12, etc., based on the control command value. The battery ECU 24 controls the cooling fan based on the control command value. In a case where the vehicle is a battery electric vehicle (BEV), the driving motor 12 functions as a drive source. In a case where the vehicle is a hybrid electric vehicle (HEV), the drive source includes the driving motor 12 and an engine. The drive ECU 22 controls the driving motor 12 to control a traveling speed and longitudinal acceleration of the vehicle, for instance.

The brake ECU 26 controls the brake actuator 16, etc., based on the control command value. The brake actuator 16 corresponds to an electric motor for driving an electric brake and/or a solenoid of an electromagnetic valve for controlling a hydraulic pressure of a hydraulic brake. The brake ECU 26 controls the brake actuator 16 to control deceleration of the vehicle, whereby the traveling speed of the vehicle is controlled.

The steering ECU 28 controls the steering motor 18, etc., based on the control command value.

In a steering system in which torsion of a steering shaft is converted into a lateral movement of a steering rod via a rack and pinion so as to steer the wheels, the steering motor 18 may be a motor for twisting the steering shaft. (This motor may be referred to as a power steering motor.) In a steering system in which the steerable wheels are individually controlled, the steering motor 18 may be a motor provided for each of the steerable wheels. The steering ECU 28 controls the steering motor 18 to control a turning state of the vehicle, for instance.

Figure 5:
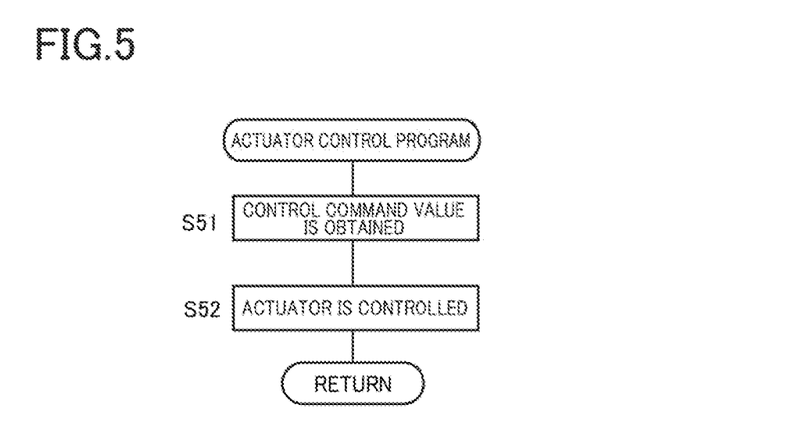
FIG. 5 is a flowchart representing an actuator control program stored in the control device.

The steering ECU 28 executes an actuator control program represented by a flowchart of FIG. 5 at intervals of a cycle time.

At Step 51, the steering ECU 28 obtains the control command value. (Hereinafter, Step 51 will be abbreviated as S51. Other steps will be similarly abbreviated.) At S52, the steering ECU 28 controls the steering motor 18, etc., based on the control command value.

The actuator control program is executed also by the drive ECU 22, the battery ECU 24, and the brake ECU 26.

In the present embodiment, the automated driving controller 20 supplies the travel plan of the vehicle to the drive ECU 22, the battery ECU 24, the brake ECU 26, and the steering ECU 28. The automated driving controller 20 may supply, to these ECUs 22-28, the travel plan for an entire route from the current location to a destination. (The travel plan for an entire route will be hereinafter referred to as "entire-route travel plan" where appropriate.) Alternatively, the automated driving controller 20 may supply, to these ECUs 22-28, a part of the entire-route travel plan such as a travel route candidate and target traveling values from the current location to a certain location at which the vehicle arrives after a lapse of a set time. The part of the entire-route travel plan may include one or more sections or may include part of one section. In the following description, each of the entire-route travel plan and the part thereof is referred to as the travel plan.

When the steering ECU 28 obtains the travel plan, a predicted temperature of the steering motor 18 is obtained. The predicted temperature of the steering motor 18 represents a state of the steering motor 18 when the vehicle travels according to the travel plan, in other words, when the vehicle travels at the target traveling values along the travel route candidate. The predicted temperature of the steering motor 18 may be obtained, for instance, based on: the temperature of the steering motor 18 at the present time point; and a heat generation amount and a heat dissipation amount of the steering motor 18 in a time period during which the vehicle travels according to the travel plan.

In a case where the travel plan includes a plurality of sections, the heat generation amount and the heat dissipation amount of the steering motor 18 are obtained as those when the vehicle travels at the target traveling values (the target traveling speed, the target lateral acceleration, and the target lateral jerk) set for each of the plurality of sections along the travel route candidate set for each of the plurality of sections.

Based on the target traveling values (such as the target traveling speed, the target lateral acceleration, and the target lateral jerk) set for each of the plurality of sections, a target steering speed and a target steering torque of the steerable wheels of the vehicle are obtained. Based on the obtained target steering speed and the target steering torque of the steerable wheels, a target rotational speed and a target torque of the steering motor 18 in each of the plurality of sections are obtained.

For instance, the heat generation amount of the steering motor 18 is obtained based on a current supplied to the steering motor 18 and a load on the steering motor 18 when the steering motor 18 is operated at the target rotational speed and the target torque determined based on the target traveling values. The current supplied to the steering motor 18 is obtained based on a voltage of a battery (as one example of a power source that supplies electric power to the steering motor 18), the target rotational speed, and the target torque of the steering motor 18, for instance. The load on the steering motor 18 is obtained in consideration of the condition of the road surface, the target traveling speed, and air resistance or rolling resistance obtained based on the target traveling speed, for instance. The heat dissipation amount of the steering motor 18 is obtained based on the outside temperature detected by the outside temperature sensor 32*b* and a speed of traveling wind applied to the steering motor 18, for instance. The speed of traveling wind is obtained based on the target traveling speed.

By accumulating the heat generation amount and the heat dissipation amount of the steering motor 18 for each of the plurality of sections and obtaining a difference between the heat generation amounts and the heat dissipation amounts accumulated for the plurality of sections, the predicted temperature of the steering motor 18 when the vehicle travels according to the travel plan is obtained utilizing the temperature of the steering motor 18 at the present time point detected by the motor temperature sensor 32*a* as an initial value. Alternatively, the predicted temperature of the steering motor 18 when the vehicle travels according to the travel plan may be obtained by obtaining a difference between the heat generation amount and the heat dissipation amount for each of the plurality of sections and accumulating the differences obtained for the plurality of sections.

When the predicted temperature is not higher than a set temperature, the steering ECU 28 provides, to the automated driving controller 20, a notification that the travel plan is permitted, i.e., a permission notification.

When the predicted temperature is higher than the set temperature, on the other hand, the steering ECU 28 requests the automated driving controller 20 to modify the travel plan, namely, to replan the travel plan. For instance, the automated driving controller 20 modifies the travel plan such that a maximum value of at least one of the target lateral acceleration and the target lateral jerk set for at least one of the plurality of sections is reduced or such that an average value of at least one of the target lateral acceleration and the target lateral jerk set for at least one of the plurality of sections is reduced.

An electric motor such as the steering motor 18 is commonly designed such that protection control is started to limit the output of the electric motor when the temperature of the electric motor becomes higher than a starting threshold temperature, in an attempt to prevent overheating of the electric motor due to long-time energization thereof. The set temperature described above is a temperature at which limitation on the operation of the steering motor 18 is considered necessary. For instance, the set temperature may be a value determined based on the starting threshold temperature for the protection control. The set temperature may be equal to or lower than the starting threshold temperature.

When the predicted temperature is higher than the set temperature, the steering ECU 28 may obtain at least one of an upper limit value of the target lateral jerk (upper limit value of the target steering speed) and an upper limit value of the target lateral acceleration (upper limit value of the target steering torque) that enables the temperature of the steering motor 18 not to reach the set temperature. In this case, the steering ECU 28 may supply, to the travel-plan creating portion 40 of the automated driving controller 20, at least one of the upper limit value of the target lateral jerk and the upper limit value of the target lateral acceleration, in addition to the request for replanning.

The steering ECU 28 repeatedly executes a program for determining whether or not to permit a travel plan each time when a set length of time elapses. The program is represented by a flowchart of FIG. 2.

Figure 2:
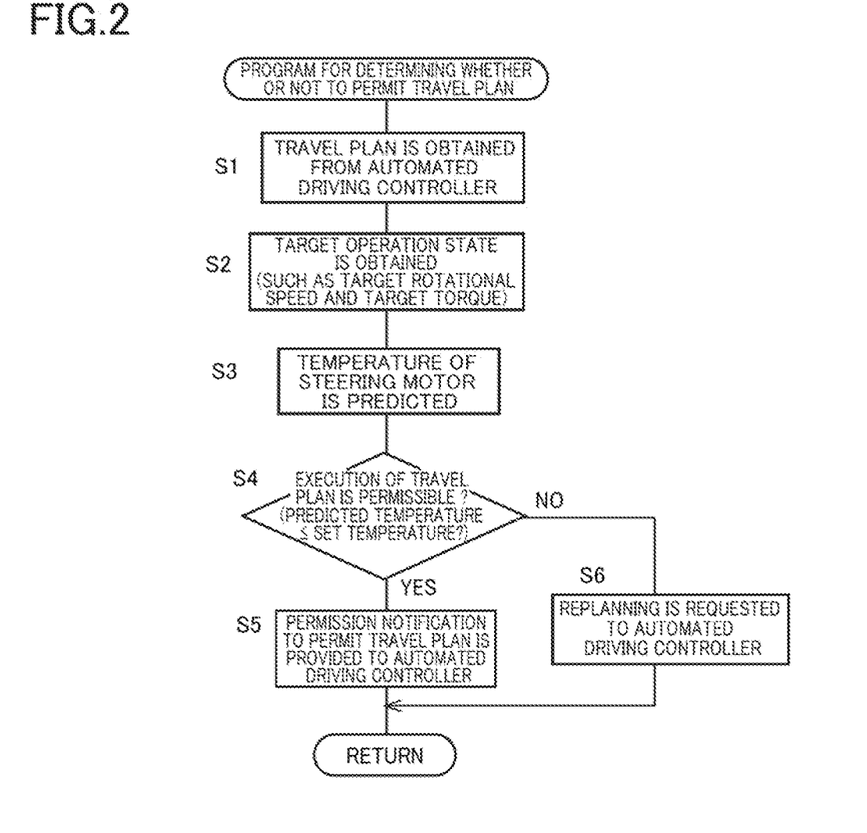
FIG. 2 is a flowchart representing a program for determining whether or not to permit a travel plan, the program being stored in a control device of the vehicle system.

At S1, the steering ECU 28 obtains the travel plan supplied from the automated driving controller 20. At S2, the steering ECU 28 obtains the target operation state of the steering motor 18 based on the target lateral acceleration and the target lateral jerk included in the travel plan. The target operation state of the steering motor 18 is represented by the target rotational speed and the target torque, for instance. At S3, the steering ECU 28 obtains the predicted temperature of the steering motor 18. At S4, the steering ECU 28 determines whether the travel plan is executable, in other words, the steering ECU 28 determines whether execution of the travel plan is permissible. Specifically, the steering ECU 28 determines whether the predicted temperature is not higher than the set temperature. When an affirmative determination (YES) is made at S4, the control flow proceeds to S5 at which the steering ECU 28 provides, to the automated driving controller 20, the permission notification that the travel plan is permissible. When a negative determination (NO) is made at S4, on the other hand, the control flow proceeds to S6 at which the steering ECU 28 requests the automated driving controller 20 to replan the travel plan for reducing the heat generation amount of the steering motor 18.

Figure 3:
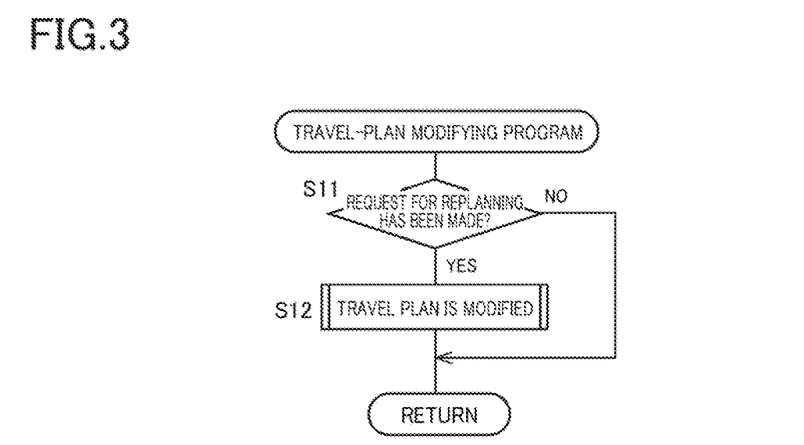
FIG. 3 is a flowchart representing a travel-plan modifying program stored in the control device.

The automated driving controller 20 executes a travel-plan modifying program represented by a flowchart of FIG. 3.

At S11, it is determined whether the request for replanning the travel plan has been made. When a negative determination (NO) is made at S11, S12 is not implemented. When an affirmative determination (YES) is made at S11, on the other hand, the travel plan is modified at S12. The travel-plan creating portion 40 modifies the travel plan such that the predicted temperature of the steering motor 18 is lowered. For instance, the travel-plan creating portion 40 modifies the travel plan such that at least one of the target lateral acceleration and the target lateral jerk in one or more of the plurality of sections is reduced. The travel plan may be modified such that at least one of the target lateral acceleration and the target lateral jerk is reduced to less than or equal to respective upper limit values thereof.

Automated driving is performed according to the permitted travel plan or the modified travel plan. The automated driving controller 20 executes an automated driving program represented by a flowchart of FIG. 4.

Figure 4:
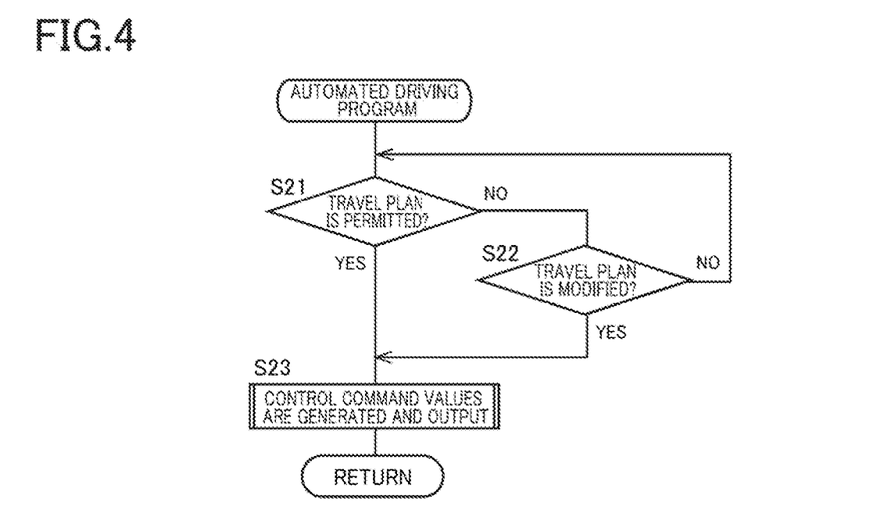
FIG. 4 is a flowchart representing an automated driving program stored in the control device.

At S21, it is determined whether the automated driving controller 20 has received the permission notification for the travel plan. When a negative determination (NO) is made at S21, it is determined at S22 whether the travel plan has been modified. When an affirmative determination (YES) is made at S21 or S22, the control flow proceeds to S23 at which the control command values are generated in accordance with the travel plan, and the generated control command values are supplied to the steering ECU 28, etc. The steering ECU 28 executes the actuator control program represented by the flowchart of FIG. 5, and the steering motor 18 is controlled based on the control command value, so that automated driving is performed according to the travel plan.

In the present embodiment described above, in a case where there is a possibility that the protection control for the steering motor 18 is started, the travel plan is replanned and the output of the steering motor 18 is limited. It is consequently possible to make automated driving less likely to be suspended due to overheating of the steering motor 18.

After having being modified, the travel plan may be again supplied to the steering ECU 28. For instance, the travel plan may be repeatedly modified until the steering ECU 28 provides the permission notification of the travel plan to the automated driving controller 20. In this instance, automated driving is performed according to the permitted travel plan.

In the present embodiment described above, a predicting portion is constituted by portions of the steering ECU 28 of the control device 10 that store and execute S3, for instance. A determining portion is constituted by portions of the steering ECU 28 of the control device 10 that store and execute S4, for instance. A notifying portion is constituted by portions of the steering ECU 28 of the control device 10 that store and execute S6, for instance. A modifying portion is constituted by portions of the automated driving controller 20 of the control device 10 that store and execute the travel-plan modifying program represented by the flowchart of FIG. 3, for instance. A steering actuator control portion is constituted by portions of the automated driving controller 20 that store and execute the automated driving program represented by the flowchart of FIG. 4 and portions of the steering ECU 28 that store and execute the actuator control program represented by the flowchart of FIG. 5, for instance.

The control device 10 may be constituted by a single computer.

Part of or the entirety of the program for determining whether or not to permit the travel plan may be executed by the automated driving controller 20.

The travel plan may be replanned for preventing overheating of not only the steering motor 18 but also the driving motor 12 and/or the brake actuator 16.

The target traveling state of the vehicle is not limited to the state represented by the travel plan in automated driving. For instance, the target traveling state of the vehicle may be a target traveling state in driving support control.

It is to be understood that the present disclosure is not limited to the details of the illustrated embodiment, but may be embodied with various changes and modifications, which may occur to those skilled in the art, without departing from the spirit and the scope of the disclosure.

Claimable Inventions (1) A vehicle system, including:
an on-board device mounted on a vehicle; and
a control device configured to control the on-board device such that the vehicle travels in a target traveling state,
wherein the control device includes:
a predicting portion that predicts a state of the on-board device when the vehicle travels in the target traveling state; and
a modifying portion that modifies the target traveling state when the control device determines based on the state of the on-board device predicted by the predicting portion that an operation of the on-board device needs to be limited.

The target traveling state may be represented by the target traveling values (such as the target traveling speed, the target longitudinal acceleration, and the target lateral acceleration) of the vehicle represented by the travel plan in automated driving or may be represented by the target traveling values (such as a target vehicle-to-vehicle distance and a target steering state) in driving support, for instance. In this respect, the target traveling state includes the planned travel route in automated driving because the traveling state of the vehicle and the operation state of the on-board device change depending on the planned travel route.

(2) The vehicle system according to the form (1),
wherein the control device includes a travel-plan creating portion that creates a travel plan of the vehicle, and
wherein the control device is configured to control the on-board device such that the vehicle travels according to the travel plan created by the travel-plan creating portion.

The travel plan includes the travel route candidate (that may be referred to as the planned travel route) and the target traveling values. In a case where the planned travel route includes one or more sections, the target traveling values include the target traveling speed, the target lateral acceleration, and/or the target longitudinal acceleration set for each of the one or more sections. The travel-plan creating portion may have a function as the modifying portion for modifying the travel plan. The modifying portion modifies at least one of the travel route candidate and the target traveling values included in the travel plan.

(3) The vehicle system according to the form (1) or (2), wherein the control device includes a determining portion that determines that the operation of the on-board device needs to be limited when the state of the on-board device predicted by the predicting portion falls outside a set state.

(4) The vehicle system according to the form (3),
wherein the predicting portion predicts a temperature of the on-board device as the state of the on-board device, and
wherein the determining portion determines that the operation of the on-board device needs to be limited when the temperature of the on-board device predicted by the predicting portion exceeds a set temperature that is the set state.

(5) The vehicle system according to any one of the forms (1) through (4),
wherein the control device includes:
a travel-plan creating portion that creates a travel plan of the vehicle; and
a notifying portion that requests the travel-plan creating portion to reset the travel plan and that notifies the travel-plan creating portion of an upper limit value of at least one of target traveling values representing the target traveling state when the controller determines based on the state of the on-board device predicted by the predicting portion that the operation of the on-board device needs to be limited.

The upper limit value of each of the target traveling values may be set such that it is not determined based on the predicted state of the on-board device that the operation of the on-board device needs to be limited. The upper limit value of each of the target traveling values may be an upper limit value of the target lateral acceleration or may be an upper limit value of an average value of the target lateral acceleration. As described above, the target lateral acceleration is one example of the target traveling values.

(6) The vehicle system according to any one of the forms (1) through (5),
wherein the on-board device includes a steering actuator that steers steerable wheels of the vehicle,
wherein the target traveling state includes a target turning state of the vehicle,
wherein the control device includes a steering actuator control portion that controls the steering actuator such that the vehicle travels in the target turning state, and
wherein the modifying portion modifies the target turning state when the control device determines that the operation of the steering actuator needs to be limited.

The target turning state is represented by the target lateral acceleration and/or the target lateral jerk, for instance. The modifying portion may reduce a maximum value or an average value of at least one of the target lateral acceleration and the target lateral jerk.

(7) The vehicle system according to the form (6),
wherein the steering actuator control portion obtains a target operation state of the steering actuator for enabling the vehicle to travel in the target turning state and controls the steering actuator such that an actual operation state of the steering actuator is brought close to the target operation state, and
wherein the predicting portion predicts a temperature of the steering actuator when the steering actuator is operated in the target operation state.

The target operation state in a case where the steering actuator is the steering motor may be represented as the target rotational speed and\or the target torque of the steering motor, for instance.

(8) The vehicle system according to the form (6) or (7),
wherein the control device includes a travel-plan creating portion that creates a travel plan of the vehicle,
wherein the target traveling state is the travel plan including a planned travel route and the target turning state,
wherein the steering actuator control portion controls the steering actuator such that the vehicle travels according to the travel plan, and wherein the predicting portion predicts a temperature of the steering actuator as a state of the steering actuator based on: the temperature of the steering actuator at a present time point; and a heat generation amount and a heat dissipation amount of the steering actuator in a time period during which the vehicle travels along the planned travel route in the target turning state.

(9) A vehicle system, including:

an on-board device mounted on a vehicle; and a control device configured to control the on-board device such that the vehicle travels according to a travel plan, wherein the control device includes:

a predicting portion that predicts a state of the on-board device when the vehicle travels according to the travel plan; and a modifying portion that modifies the travel plan when the control device determines based on the state of the on-board device predicted by the predicting portion that an operation of the on-board device needs to be limited.

The vehicle system according to this form may employ the technical features described in any one of the forms (1) through (8).

(10) A vehicle system, including:

a steering actuator that steers wheels of a vehicle; and a steering actuator control portion that controls the steering actuator such that the vehicle travels according to a travel plan, wherein the travel plan includes a planned travel route and a target turning state, and wherein the steering actuator control portion includes:

a predicting portion that predicts a temperature of the steering actuator when the steering actuator control portion controls the steering actuator such that the vehicle travels in the target turning state along the planned travel route; and a modifying portion that modifies at least one of the target turning state and the planned travel route when the temperature of the steering actuator predicted by the predicting portion is higher than a set temperature.

The vehicle system according to this form may employ the technical features described in any one of the forms (1) through (9).

What is claimed is:

1. A vehicle system, comprising:

an on-board device mounted on a vehicle; and a control device that executes a program stored in a memory, configured to:

create a travel plan of the vehicle, control the on-board device such that the vehicle travels according to the travel plan, predict a temperature of the on-board device when the vehicle travels according to the travel plan, limit an output of the on-board device so as to protect the on-board device when the temperature of the on-board device is higher than a predetermined starting threshold temperature, and modify the travel plan when the predicted temperature of the on-board device is higher than a set temperature, wherein the set temperature is lower than the predetermined starting threshold temperature, wherein the on-board device includes a steering actuator that steers at least one wheel of the vehicle, wherein the travel plan includes a planned travel route and a target turning state, wherein the target turning state includes a target lateral acceleration and a target lateral jerk, wherein the control device is further configured to:

predict a temperature of the steering actuator when the vehicle travels in the target turning state along the planned travel route, obtain an upper limit value of the target lateral acceleration and an upper limit value of the target lateral jerk when the predicted temperature of the steering actuator is higher than the set temperature, and modify the travel plan so as to make at least one of the target lateral acceleration and the target lateral jerk lower than at least one of the upper limit value of the target lateral acceleration and the upper limit value of the target lateral jerk when the predicted temperature of the steering actuator is higher than the set temperature.

2. The vehicle system according to claim 1, wherein the control device creates the planned travel route based on navigation information including map information to reach a destination, the planned travel route includes a plurality of sections, and the travel plan further comprises target traveling values including a target traveling speed, and a target longitudinal acceleration, in addition to the target lateral acceleration and the target lateral jerk, wherein the target traveling values are set in each of the plurality of sections included in the planned travel route, and when the travel plan is modified the at least one of the target lateral acceleration and the target lateral jerk is modified.

* * * * *